(12) United States Patent
Donahue

(10) Patent No.: US 11,782,204 B2
(45) Date of Patent: Oct. 10, 2023

(54) TRANSPARENT ILLUMINATION PHOTOLITHOGRAPHY METHODS AND SYSTEMS

(71) Applicant: NanoPath, Inc., Leominster, MA (US)

(72) Inventor: Kevin Donahue, Harvard, MA (US)

(73) Assignee: NanoPath, Inc., Leominster, MA (US)

( * ) Notice: Subject to any disclaimer, the term of this patent is extended or adjusted under 35 U.S.C. 154(b) by 920 days.

(21) Appl. No.: 16/362,540

(22) Filed: Mar. 22, 2019

(65) Prior Publication Data

US 2019/0293860 A1    Sep. 26, 2019

Related U.S. Application Data

(60) Provisional application No. 62/647,263, filed on Mar. 23, 2018.

(51) Int. Cl.
| | |
|---|---|
| *F21V 8/00* | (2006.01) |
| *G02C 11/04* | (2006.01) |
| *G02B 5/02* | (2006.01) |
| *G02B 27/01* | (2006.01) |

(52) U.S. Cl.
CPC ............ *G02B 6/0055* (2013.01); *G02B 5/02* (2013.01); *G02B 27/0172* (2013.01); *G02C 11/04* (2013.01)

(58) Field of Classification Search
CPC ......... G02B 5/02; G02B 6/0055; G02C 11/04
See application file for complete search history.

(56) References Cited

U.S. PATENT DOCUMENTS

| | | | |
|---|---|---|---|
| 5,940,215 A | 8/1999 | Rudisill et al. | |
| 7,513,674 B1 | 4/2009 | Donahue | |
| 8,100,575 B2 | 1/2012 | Donahue | |
| 8,511,884 B2 | 8/2013 | Donahue | |
| 9,028,123 B2 | 5/2015 | Nichol et al. | |
| 10,363,710 B2 | 7/2019 | Rodriguez et al. | |
| 2007/0058250 A1* | 3/2007 | Muramatsu | G02B 5/0278 359/493.01 |
| 2010/0053997 A1* | 3/2010 | Teng | G02B 6/0038 362/617 |

(Continued)

FOREIGN PATENT DOCUMENTS

WO    WO-2018/019035 A1    2/2018

OTHER PUBLICATIONS

Hung et al., Total-internal-reflection-based photomask for large-area photolithography, Nov. 28, 2015, Optics & Laser Technology 79, p. 39-44 (Year: 2015).

(Continued)

*Primary Examiner* — Elizabeth A Burkhart
(74) *Attorney, Agent, or Firm* — Foley & Lardner LLP

(57) ABSTRACT

A method of forming a one-way see-through illumination device including a light guide and a pattern of pixels on a surface of the light guide. The method includes forming pixel wells corresponding to the pixels, via a formation method including photolithography, on the surface of the light guide. The pixels, including a light diffusing layer and a light reflecting layer, are formed using the pixel wells, wherein the pattern of pixels and the light guide are arranged to generate transparent illumination by the frustration of total internal reflection of light injected into the light guide.

12 Claims, 3 Drawing Sheets

(56) References Cited

U.S. PATENT DOCUMENTS

2012/0134172 A1* 5/2012 Donahue .............. G02C 11/04
362/602
2015/0277146 A1 10/2015 Vazquez et al.
2018/0372626 A1 12/2018 Craig et al.

OTHER PUBLICATIONS

International Preliminary Report on Patentability on PCT/US2019/023747 dated Oct. 8, 2020.
U.S. Office Action on U.S. Appl. No. 16/373,213 dated Mar. 26, 2021.
International Search Report and Written Opinion of the International Searching Authority dated Jun. 18, 2019 for International Application No. PCT/US2019/023747 (13 pages).

* cited by examiner

TRANSPARENT ILLUMINATION PHOTOLITHOGRAPHY METHODS AND SYSTEMS

CROSS-REFERENCE TO RELATED APPLICATION

This application claims priority to U.S. Provisional Application Ser. No. 62/647,263 filed Mar. 23, 2018, entitled "TRANSPARENT ILLUMINATION PHOTOLITHOGRAPHY METHODS AND SYSTEMS," incorporated by reference herein in its entirety.

FIELD OF DISCLOSURE

Systems and methods are described for improving transparent illumination using photolithography, etching, and material deposition techniques.

BACKGROUND

In U.S. Pat. Nos. 8,511,884, 7,513,674 and 8,100,575, various implementations of devices and methods for rendering one-way see-through illumination, also called transparent illumination, are disclosed.

Transparent illumination features the illumination of a surface of an optically clear material and no illumination of the opposing surface. Examples of transparent illumination include an eyeglass lens with an illuminated exterior lens surface that cannot be seen by the eyeglass wearer and a window that features exterior illumination that cannot be seen by witnesses of the interior surface of the window. Prior to the current solution, transparent illumination deterred views through its non-illuminated surface due to the visibility of light-emitting markings/pixels (pixels greater than 25 microns in width) and stray light emission from the non-illuminated surface caused by light reflection from the front surface of the optical material.

SUMMARY

According to the inventive concepts disclosed herein there is provided a method of forming a one-way see-through illumination device including a light guide and a pattern of pixels on a surface of the light guide. The method comprising: forming pixel wells corresponding to the pixels, via a formation method including photolithography, on the surface of the light guide; and forming the pixels, including a light diffusing layer and a light reflecting layer, using the pixel wells, wherein the pattern of pixels and the light guide are arranged to generate transparent illumination by the frustration of total internal reflection of light injected into the light guide.

According to an aspect of the inventive concepts disclosed herein, the formation method includes depositing a light-diffusing material to form the light diffusing layer.

According to an aspect of the inventive concepts disclosed herein, the formation method includes etching the light guide by laser ablation or chemical etching to produce the light diffusing layer.

According to an aspect of the inventive concepts disclosed herein, the formation method includes one of ion implantation, or physical or chemical vapor deposition, to produce the light diffusing layer.

According to an aspect of the inventive concepts disclosed herein, the formation method includes physical or chemical vapor deposition to produce the light diffusing layer.

According to an aspect of the inventive concepts disclosed herein, the light diffusing layer is a metal oxide.

According to an aspect of the inventive concepts disclosed herein, the light diffusing layer is a titanium oxide.

According to an aspect of the inventive concepts disclosed herein, the light diffusing layer is formed by at least one of atomic layer deposition, physical vapor deposition or chemical vapor deposition.

According to an aspect of the inventive concepts disclosed herein, a cumulative pixel surface area of the pixel pattern is insufficient to block ambient light transmission through the light guide.

According to an aspect of the inventive concepts disclosed herein, the light guide has a front side and a rear side opposite to the front side, the light diffusing layer being closer to the front side than the light reflecting layer, wherein each pixel of the pixel pattern is arranged to not be perceived by a human eye on the rear side. According to an aspect of the inventive concepts disclosed herein, the pixels may be arranged to promote destructive wave interference of ambient light to avoid the diffraction of ambient light, i.e., the generation of visible rainbows.

According to an aspect of the inventive concepts disclosed herein, the pixels have a width less than a width of a wavelength of visible light.

According to an aspect of the inventive concepts disclosed herein, the pixels have a width less than 15 microns.

According to an aspect of the inventive concepts disclosed herein, the pixels have a width less than 1 micron.

According to an aspect of the inventive concepts disclosed herein, the formation method includes: forming a patterned photoresist on the surface of the light guide; forming the light diffusing layer and the light reflecting layer; and removing the patterned photoresist.

According to an aspect of the inventive concepts disclosed herein, the light reflecting layer is formed after the light diffusing layer.

According to an aspect of the inventive concepts disclosed herein, the light reflecting layer is formed by depositing a light reflecting layer on the patterned photoresist and the light diffusing layer, and then removing the patterned photoresist.

According to an aspect of the inventive concepts disclosed herein, the method further comprises: forming a light source at an edge of the light guide, the light source configured to inject light into the edge of the light guide.

According to an aspect of the inventive concepts disclosed herein, the light source includes a light emitting diode.

According to an aspect of the inventive concepts disclosed herein, the light reflecting layer is a metal.

According to an aspect of the inventive concepts disclosed herein, the light reflecting layer is aluminum.

According to the inventive concepts disclosed herein there is provided a one-way see-through illumination device. The device comprises a light guide; a light source at an edge of the light guide, and configured to inject light into the edge of the light guide; a pattern of pixels on a surface of the light guide, the pixels including a light diffusing layer and a light reflecting layer, wherein the pattern of pixels and the light guide are arranged to generate transparent illumination by the frustration of total internal reflection of light injected into the light guide, wherein the pixels have a width less than 15 microns.

According to an aspect of the inventive concepts disclosed herein, the pixels have a width less than 1 micron.

According to an aspect of the inventive concepts disclosed herein, the light diffusing layer is a metal oxide.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

According to at least one disclosed embodiment, there is provided an improvement in the transparency of transparent illumination of a one-way see-through illumination device, including rendering invisible pixels that emit light in one direction by deploying techniques such as photolithography and material deposition, such as techniques used to produce semiconductors.

According to at least one embodiment, a pixelated surface is established upon an optical material, such as a transparent light guide, where the pixelated surface features pixels composed of a light diffusing surface capped by a light reflecting surface. The light diffusing surface emits light by frustrating the total internal reflection of light present within the optical material due to edge-injection from a light source, such as an LED (light emitting diode). The light reflecting surface within each pixel, which is composed of a layer of light absorbing or light reflecting material, then generates transparent illumination by denying two-way light emission by the light diffusing layer. That is, the light originating from the LED is emitted from the one side of the device, but not the other side.

In general, the methods and systems practiced according to at least one embodiment involve the formation of an invisible pixel pattern by the formation techniques such as photoresist deposition, exposure, and development of a photoresist, e.g., photolithography, followed by the formation of a layer of light diffusing material which is then capped by a light reflecting material, such as a metal, for example, aluminum, where such techniques allow for formation of small pixel sizes.

Figure 1A:
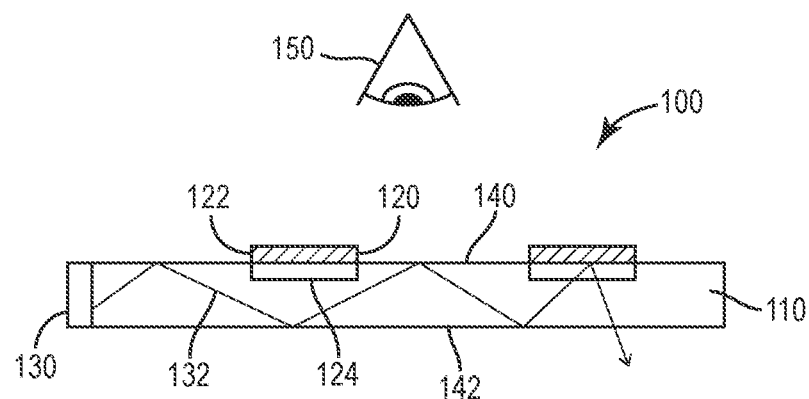
FIG. 1A is a side view illustrating a one-way see-through illumination device of an embodiment according to inventive concepts disclosed herein.
Figure 1B:
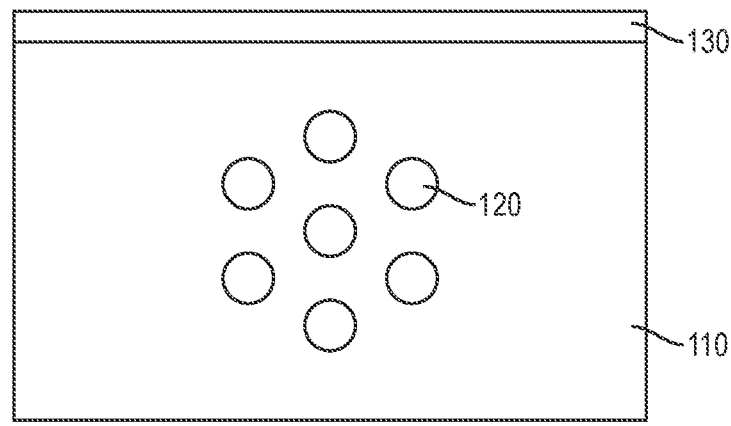
FIG. 1B is a top view of the see-through illumination device of FIG. 1A according to inventive concepts disclosed herein.

FIG. 1A is a side view illustrating a one-way see-through illumination device 100 formed by a method according to at least one embodiment. FIG. 1B is a top view of the one-way see-through illumination device 100 of FIG. 1A. The illumination device 100 includes a light guide 110, a light source 130, and a pattern of pixels 120 on a surface 140 of the light guide 110. Each the pattern of pixels 120 includes a light diffusing layer 124 and a light reflecting layer 122. The illumination device 100 further includes a surface 142 of the light guide opposite to the surface 140. The surface 140 may be referred to as the front surface, while the surface 142 may be referred to as the back surface.

Some of the light, but not all, originally emitted from the light source 130 is ultimately directed (by the frustration of total internal reflection by the pixel surface) to the front surface 140 and exits the front surface 140. On the other hand, light originally emitted from the light source 130 which is directed to the back surface 142 is totally internally reflected and does not exit the back surface. Thus, the eye 150 of a viewer which is on the side of the front surface 140 is able to view light originating from the light source 130 and injected into the light guide 110. On the other hand, the eye 150 of a viewer, if the eye 150 is on the side of the back surface 142, is not able to view light originating from the light source 130 and injected into the light guide 110. Thus, the light originating from the light source 130 and injected into the light guide 110 appears to be invisible from the back surface 142.

A light ray 132 is emitted from the light source 130 and directed into the light guide 110 at an angle such that the light ray 132 impinging on the front surface 140 or back source 142 undergoes total internal reflection, and the light ray 132 stays within the light guide 110. The light diffusing layer 124 is chosen to be made of a light diffusing material which has an index of refraction such that when the light ray 132 originally emitted from the light source 130 impinges on the light diffusing layer 124, total internal reflection does not occur, and the light ray 132 is transmitted into the light diffusing layer 124. The light ray 132 transmitted into the light diffusing layer 124 is diffused and impinges on the light reflecting layer 122, where the light ray 132 is reflected back into the light diffusing layer 124 and is further diffused. The reflected and diffused light from the light diffusing layer 124 then exits the light diffusing layer 124, and impacts the front surface 140 at less than the critical angle such that the light exits the light guide 110, and can be seen.

The one-way see-through illumination device 100 may be formed using photolithographic techniques and other techniques, such as for example, semiconductor device processing techniques.

Figure 2:
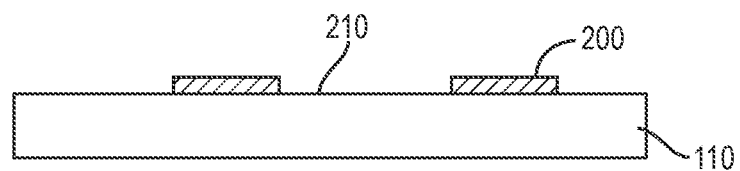
FIG. 2 is a side view illustrating forming a patterned photoresist of an embodiment according to inventive concepts disclosed herein.

FIG. 2 is a side view illustrating forming a patterned resist 200 according to at least one embodiment. A photoresist may be spun on the light guide 110. The spun on resist may be formed according to a variety of techniques and resist materials. For example, a positive, or negative, photoresist is spin-coated onto the surface of light guide 110, which may be, for example, a disc composed of glass or an optically clear plastic, such as PETG, PMMA, or polycarbonate. After curing the spun on resist, a light exposure mask is applied to the photoresist surface followed by UV-light exposure, for example. After the light radiation exposure, the photoresist is developed to form the patterned photoresist 200, causing the presence of areas of patterned photoresist 200 that expose the surface of the light guide 110. An example of an applicable photoresist would be All Resist Positive Lift-off Resist which can be stripped from the optical material after being coated by a light-reflective layer, such as a metal. The patterned photoresist 200 provides pixel wells 210 in the photoresist 200 to form the pixels 120 therein, the pixels 120 including the light diffusing layer 124 and the light reflecting layer 122. Thus, both the light-diffusing layer 124 and the light reflecting layer 122 can be formed using photolithographic techniques.

Pixel widths may be below 15 microns to ensure invisibility. Further, pixel widths may be sub-micron to induce transparent illumination without generating a diffraction grating, e.g., the presence of rainbow patterns when viewing ambient light.

Figure 3A:
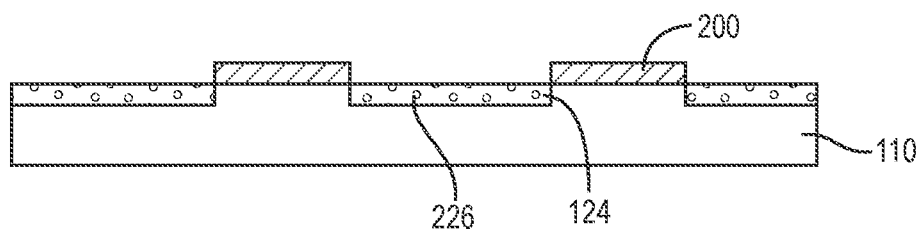
FIG. 3A is a side view illustrating forming a light diffusing layer by ion implantation of an embodiment according to inventive concepts disclosed herein.
Figure 3B:
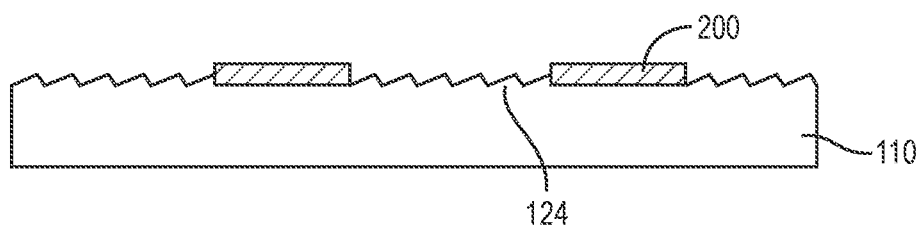
FIG. 3B is a side view illustrating forming a light diffusing layer by etching of an embodiment according to inventive concepts disclosed herein.
Figure 3C:
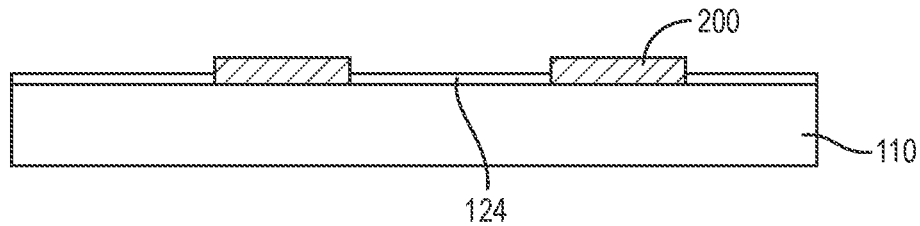
FIG. 3C is a side view illustrating forming a light diffusing layer by layer deposition of an embodiment according to inventive concepts disclosed herein.

FIGS. 3A-3C illustrate different processing techniques for forming the light diffusing layer 124. As shown in FIG. 3A, the light diffusing layer 124 may be formed by ion implantation by ions 226. The light diffusing layer 124 illustrates only a relatively few ions 226 for ease of illustration. In practice, the number of ions 226 may be several orders of magnitude larger. The ions 226 may be metal ions implanted into the light guide 110. The ions 226 cause structural disorder in the regions of the light guide 110 that are implanted. This structural disorder causes the region of the light guide 110 that are implanted to function as a light diffusing layer 124.

The ions 226 pass into the light guide 110 only at the pixel wells 210 where the light guide 110 is exposed by the patterned photoresist 200. Thus, the light diffusing layer 124 is formed only at the pixel wells 210.

As shown in FIG. 3B, the light diffusing layer 124 may be formed by etching the surface of the light guide which is exposed by the patterned photoresist 200. The etching may be laser ablation or chemical etching, for example. The chemical etching may be wet or dry etching, for example. The dry etching may be reactive ion etching (RIE), for example. The etching causes a roughened surface in the regions of the light guide 110 that are etched. This roughened surface causes the region of the light guide 110 that are etched to function as a light diffusing layer 124.

The etching is performed only at the pixel wells 210 where the light guide 110 is exposed by the patterned photoresist 200. Thus, the light diffusing layer 124 is formed only at the pixel wells 210.

As shown in FIG. 3C, the light diffusing layer 124 may be formed by depositing a light diffusing layer on the surface of the light guide 110 which is exposed by the patterned photoresist 200. The deposition methods include physical vapor deposition, atomic layer deposition, and/or chemical vapor deposition, for example. For example, the light diffusing layer 124 may be formed by the deposition of titanium dioxide by atomic layer deposition, or the co-deposition of silicon dioxide and titanium dioxide by vapor deposition, for example.

The deposition of the light diffusing layer 124 in FIG. 3C contacts the light guide 110 only at the pixel wells 210 where the light guide 110 is exposed by the patterned photoresist 200. Thus, the light diffusing layer 124 is formed only at the pixel wells 210.

The deposition of the light diffusing layer 124 in FIG. 3C may be performed using any coating capable of producing a light diffusing layer within the pixel well 210, including coatings that contain light diffusing particles/pigments and/ or coatings in which the light diffusing layer 124 can be induced by subsequent light exposure, or other means, such as a photographic coating.

Figure 4:
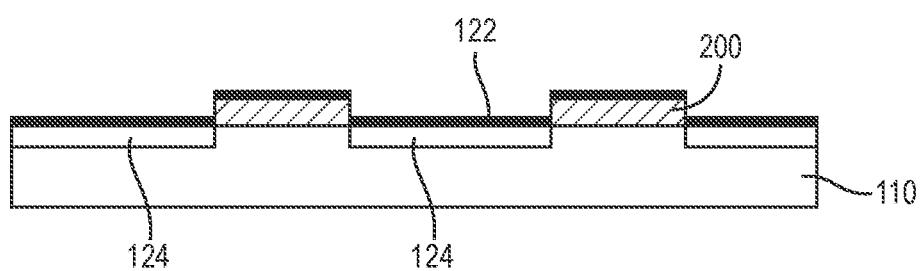
FIG. 4 is a side view illustrating forming a light reflecting layer of an embodiment according to inventive concepts disclosed herein.

Once the light diffusing layer 124 is formed, the light reflecting layer 122 may be formed on the light diffusing layer 124, such as, for example, as shown in FIG. 4. For example, the light diffusing layer 124 may be formed by deposition of a reflecting material on the light diffusing layer 124. The deposited reflecting material may be formed to contact the light diffusing layer 124 only at the pixel wells 100 where the light guide 110 is exposed by the patterned resist 200. Thus, the light reflecting layer 122 is formed on the light diffusing layer 124 only at the pixel wells 210.

The light reflecting layer 124 may be formed, for example, by sputter deposition of a metal. For example, Aluminum may be deposited as the light reflecting layer 124. An example of a light reflecting layer 124, capable of reflecting 99.99% of incidental light, would be 400 Angstroms of Aluminum applied by magnetron sputter coating.

Figure 5:
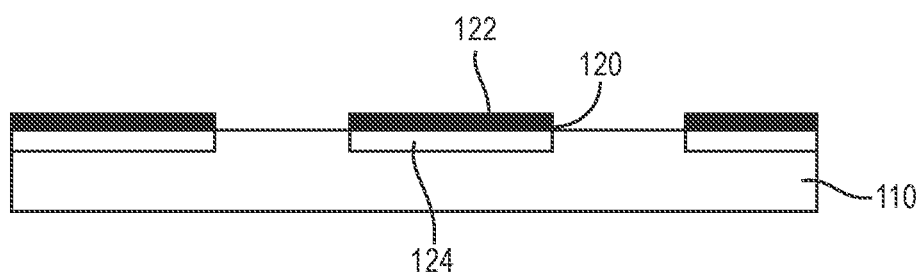
FIG. 5 is a side view illustrating forming a light reflecting layer with the photoresist pattern removed of an embodiment according to inventive concepts disclosed herein.

Referring to FIG. 5, following the deposition of the light reflecting layer 124 the remaining patterned photoresist 200 is stripped or lifted off from the surface of the light guide 110, for example, using a stripping agent that is compatible with the utilized photoresist.

The embodiments of the inventive concepts disclosed herein have been described in detail with particular reference to preferred embodiments thereof, but it will be understood by those skilled in the art that variations and modifications can be effected within the spirit and scope of the inventive concepts.

Embodiments of the inventive concepts disclosed herein have been described with reference to drawings. The drawings illustrate certain details of specific embodiments that implement systems and methods of the present disclosure. However, describing the embodiments with drawings should not be construed as imposing any limitations that may be present in the drawings.

The foregoing description of embodiments has been presented for the purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments with various modification as are suited to the particular use contemplated. Other substitutions, modifications, changes and omissions may be made in the design, operating conditions and arrangement of the embodiments without departing from the scope of the presently disclosed subject matter.

What is claimed is:

1. A method of forming a one-way see-through illumination device including a light guide and a pattern of pixels on a surface of the light guide, the method comprising:
    forming pixel wells corresponding to the pattern of pixels by forming a layer of photoresist on the surface of the light guide according to the pattern of pixels;
    forming a light diffusing layer within the pixel wells;
    forming each pixel of the pattern of pixels by:
        forming a light reflecting layer on the light diffusing layer and the layer of photoresist; and
        removing the layer of photoresist and a portion of the light reflecting layer deposited on the layer of photoresist to expose a portion of the surface of the light guide, wherein the pattern of pixels and the light guide are arranged to generate transparent illumination by the frustration of total internal reflection of light injected into the light guide.

2. The method of claim 1, wherein forming the light diffusing layer comprises depositing a light-diffusing material.

3. The method of claim 1, wherein forming the light diffusing layer comprises etching the light guide by laser ablation or chemical etching to produce the light diffusing layer.

4. The method of claim 1, wherein forming the light diffusing layer comprises performing at least one of ion implantation, or physical or chemical vapor deposition, to produce the light diffusing layer.

5. The method of claim 1, wherein the light diffusing layer comprises a metal oxide.

6. The method of claim 5, wherein the light diffusing layer comprises a titanium oxide.

7. The method of claim 1, wherein a cumulative pixel surface area of the pattern of pixels is insufficient to block ambient light transmission through the light guide.

8. The method of claim 1, wherein the light guide has a front side and a rear side opposite to the front side, the light diffusing layer being closer to the front side than the light reflecting layer, wherein each pixel of the pattern of pixels is arranged to not be perceived by a human eye on the rear side.

9. The method of claim 1, wherein the pattern of pixels promotes destructive wave interference of ambient light to avoid the diffraction of ambient light.

10. The method of claim 1, wherein each pixel has a width less than 15 microns.

11. The method of claim 10, wherein each pixel has a width less than 1 micron.

12. The method of claim 1, further comprising:
    forming a light source at an edge of the light guide, the light source configured to inject light into the edge of the light guide.

* * * * *